United States Patent
Fridman et al.

(10) Patent No.: US 10,757,136 B2
(45) Date of Patent: Aug. 25, 2020

(54) BOTNET BEACONING DETECTION AND MITIGATION

(71) Applicant: Verizon Patent and Licensing Inc., Arlington, VA (US)

(72) Inventors: Yonatan Fridman, Divide, CO (US); Kenneth J. Mckeever, Denver, CO (US); Karl Stang, Manitou Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1015 days.

(21) Appl. No.: 14/838,889

(22) Filed: Aug. 28, 2015

(65) Prior Publication Data

US 2017/0063921 A1    Mar. 2, 2017

(51) Int. Cl.
*H04L 29/06* (2006.01)

(52) U.S. Cl.
CPC ...... *H04L 63/1466* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 8,195,750 B1 * | 6/2012 | Bakhmutov | ............ | H04L 51/12 709/206 |
| 8,578,493 B1 * | 11/2013 | Cowan | ................. | G06F 21/554 709/224 |
| 2008/0320095 A1 * | 12/2008 | Pearson | .................. | H04L 51/12 709/207 |
| 2009/0254989 A1 * | 10/2009 | Achan | ................. | H04L 63/1441 726/22 |
| 2010/0082800 A1 * | 4/2010 | Wei | ........................ | H04L 51/12 709/224 |
| 2011/0126136 A1 * | 5/2011 | Abella | .................. | H04L 43/028 715/764 |
| 2011/0153811 A1 * | 6/2011 | Jeong | ...................... | H04L 63/14 709/224 |
| 2012/0291125 A1 * | 11/2012 | Maria | ................. | H04L 63/1416 726/22 |
| 2014/0215624 A1 * | 7/2014 | Suzio | .................... | G06F 21/554 726/23 |
| 2016/0381070 A1 * | 12/2016 | Zhang | .................. | H04L 63/145 726/23 |

\* cited by examiner

*Primary Examiner* — Michael R Vaughan

(57) ABSTRACT

A botnet detector collects data associated with flows between a pair of network elements. The botnet detector processes the flow data to determine whether some of the flows are associated with botnet beaconing and/or tunneling. For example, the botnet detector may determine whether some of the flows occur at a regular interval or whether some of the flows are associated with extended length sessions, respectively. To determine whether some of the flows occur at a regular interval, the botnet detector may convert the flow data to the frequency domain and may determine an interval associated with a highest vector magnitude. If the botnet detector determines that the pair of network elements are exchanging beaconing or tunneling signals, the botnet detector may forward a notification that the pair of network elements are associated with the botnet.

20 Claims, 12 Drawing Sheets

FIG. 3

| FLOW IDENTIFIER (ID) COLUMN 310 | FLOW START TIME COLUMN 320 | FLOW END TIME COLUMN 330 |
|---|---|---|
| FLOW ID 1 (SOURCE IP ADDRESS 14, DESTINATION IP ADDRESS 14, SOURCE PORT, DESTINATION PORT, AND LAYER 4 PROTOCOL 1) | START TIME 1 | END TIME 1 |
| ⋮ | ⋮ | ⋮ |
| FLOW ID N (SOURCE IP ADDRESS N, DESTINATION IP ADDRESS N, SOURCE PORT, DESTINATION PORT, AND LAYER 4 PROTOCOL N) | START TIME N | END TIME N |

FLOW DATA TABLE 300

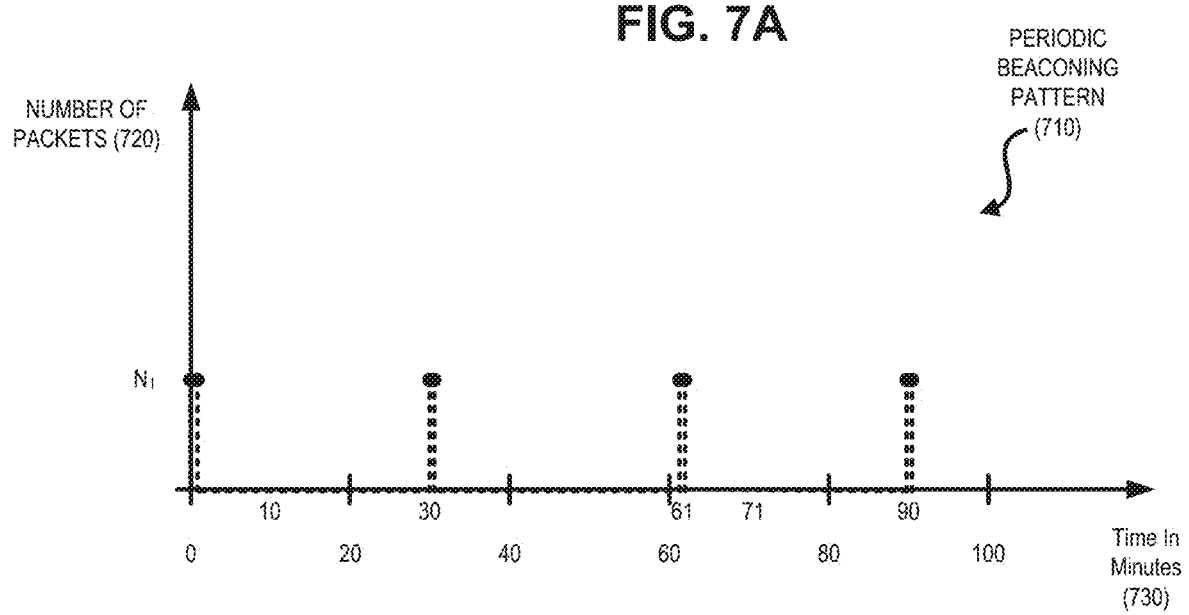

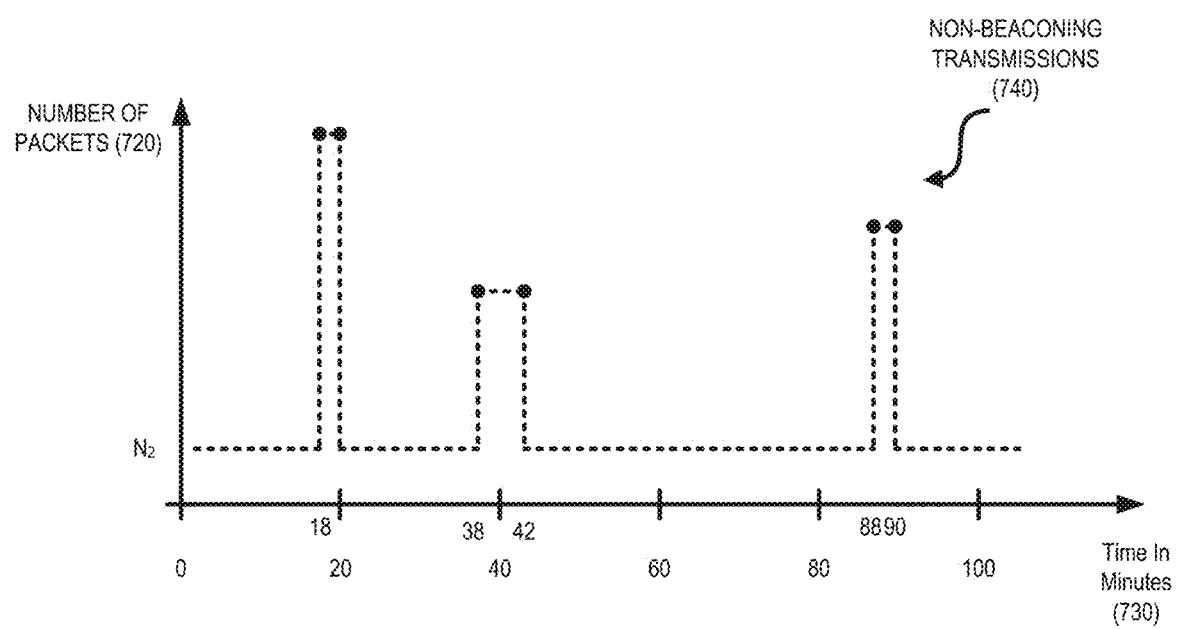

BOTNET BEACONING DETECTION AND MITIGATION

BACKGROUND

A "botnet" generally refers to a collection of compromised hosts (often referred to as "zombie" computers/devices) running a malicious application (referred to as a "bot") that allows the compromised hosts to be remotely controlled. The bots are controlled by a "bot master" (or "bot herder") through a "command and control" (C&C) channel. For example, bots can be implemented as individual programs (referred to as "software agents"), and the C&C channel connects the botnet to a server (referred to as a "C&C server") forwarding instructions to the bots.

For example, the bot master may send out malware, such as a virus or worm, that infects computing devices with a bot. The bot may be executed on the infected computing devices and may communicate with the C&C server to receive instructions. Some bots may also automatically scan their computing/device environment and propagate themselves to other computers/devices using vulnerabilities (e.g., weak passwords). A bot may execute in a stealth mode to avoid detection and may communicate with the C&C server using a covert channel, such as an Internet Relay Chat (IRC) channel defined in Internet Engineering Task Force (IETF) Request for Comments (RFC) 1459.

BRIEF DESCRIPTION OF THE DRAWINGS

FIG. 3 shows a table that includes exemplary flow data that may be collected and processed in the environment shown in FIG. 1A;

FIGS. 7A-7C, 8, and 9 show graphs illustrating examples of the operation of a botnet detector in the environment shown in FIG. 1A.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1A:
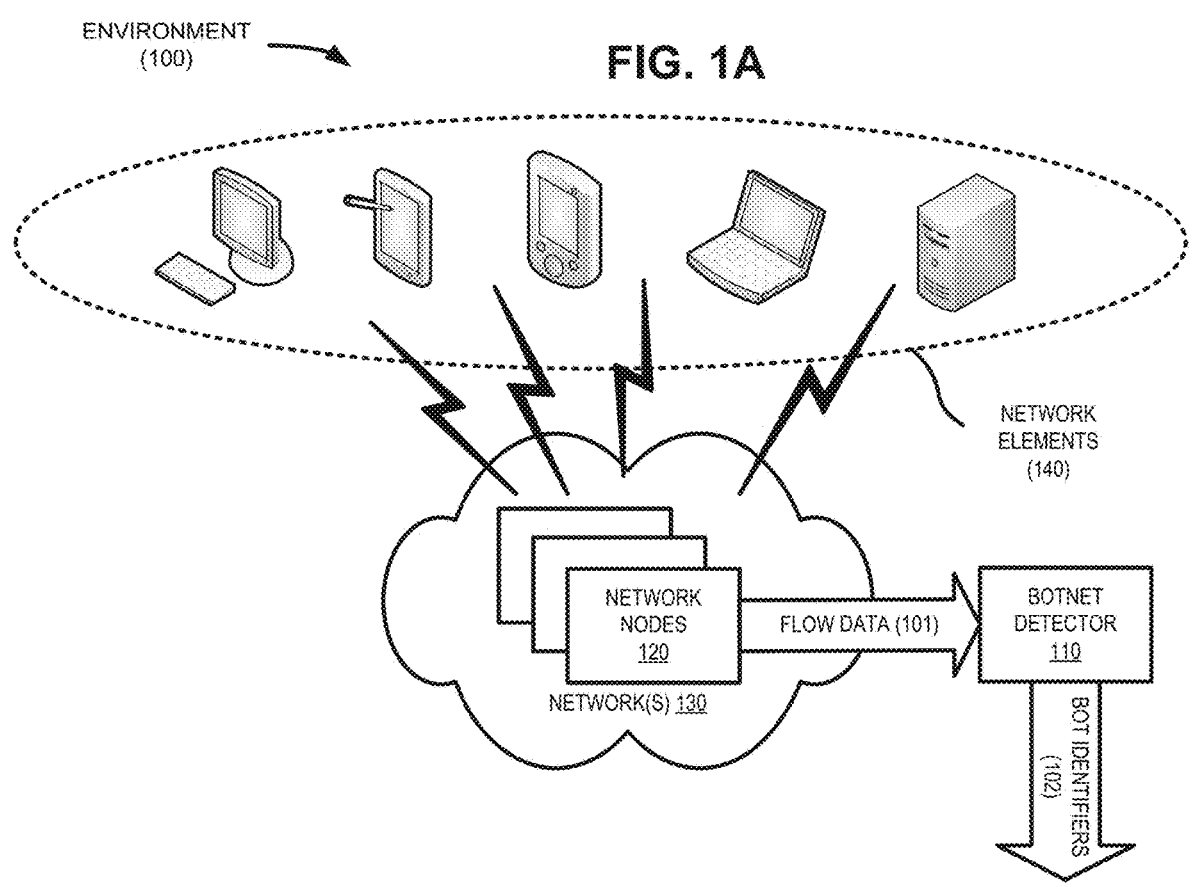
FIG. 1A shows an exemplary environment in which systems and/or methods described herein may be implemented.

FIG. 1A is a diagram of an exemplary environment 100 in which systems and/or methods described herein may be implemented. As shown in FIG. 1A, environment 100 may include a botnet detector 110, network nodes 120 in network 130, and network elements 140. As described in greater detail below, flow data 101 may describe attributes of flows between network elements 140. Flow data 101 are exchanged in network 130 via network nodes 120.

Botnet detector 110 may collect flow data 101 from the network nodes 120 and may process flow data 101 to generate bot identifiers 102 or other notification that identify network elements that may be included in a botnet. Botnet detector 110 may process flow data 101 to identify flows having certain attributes associated with botnet beaconing and may flag or otherwise identify certain network elements 140 exchanging flows that may be associated with botnet beaconing. Botnet detector 110 may also generate bot identifiers 102 for the identified network elements 140.

For example, botnet detector 110 may identify flows that occur at substantially regular, periodic intervals, because periodically occurring flows may be associated with beaconing signals sent within a botnet. In another example, botnet detector 110 may identify flows associated with extended sessions (e.g., sessions that last more than a threshold duration) between network elements 140 and network nodes 120 because botnets may open such extended sessions to receive instructions and/or forward data.

Bot identifiers 102 may include data identifying network elements 140 that display particular behaviors associated with a botnet.

As used herein, a flow is a set of unidirectional data units (e.g., Internet Protocol (IP) packets) having shared common flow properties, such as source IP address, source Transmission Control Protocol (TCP) port, etc. and that pass through an observation point (e.g., a network node 120) during a time interval. A flow property may be associated with, for example, one or more packet header fields (e.g., destination IP address), transport header fields (e.g., destination port number), or application header fields (e.g., real-time protocol (RTP) header fields); one or more characteristics of the flow packets (e.g., number of multiprotocol label switching (MPLS) labels); or one or more fields derived from packet treatment/processing (e.g., next hop IP address, output interface).

Flow data 101 may include "Netflow" data. As used herein, NetFlow may include a network protocol used for collecting information about network traffic (e.g., IP packets). For example, NetFlow Services Export Version 9 is described in Internet Engineering Task Force Request for Comments (RFC) 3954, and IP Flow Information Export (IPFIX) Protocol is described in RFC 5101. NetFlow typically allows a user (e.g., system or network administrator) to define certain characteristics, and to collect flow data that matches the defined characteristics.

Flows passing through network 130 may be exchanged and/or monitored by network nodes 120. Network nodes 120 may be capable of receiving packets from a source network elements 140, and forwarding packets in network 130 toward a destination network element. In one example, network nodes 120 may be separate computing devices running server applications (e.g., in a client-server network architecture). In other examples, network nodes 120 may be separate virtual machines on the same or different computing devices (e.g., server blades in a data center and/or server blades configured in one or more chassis). In one implementation, network nodes 120 may exchange flow data within network 130 and may communicate with botnet detector 110 via a different network. In other embodiments, network nodes 120 may forward flow data 101 to botnet detector 110 via a network 130 (e.g., botnet detector 110 may be a device within network 130 and/or may be a component of a network node 120).

Network nodes 120 may collect flow data 101 through network 130 and may forward flow data 101 to botnet detector 110 (e.g., via one or more networks 130). Network nodes 120 may include observation points (not shown) at which flow data (e.g., IP packets) may be collected. Examples of observation points include a line to which a probe is attached, a shared medium (e.g., Ethernet-based Local Area Network (LAN)), a port of a router, or a set of physical or logical interfaces of a router, etc. Flows in network 130 may traverse an observation point via network nodes 120.

Network nodes 120 may collect flow data 101 at a given NetFlow interface. Information about the packets of a flow may be condensed by network nodes 120 into a database called a NetFlow cache. Network nodes 120 may maintain separate NetFlow caches or multiple network nodes 120 may store flow data 101 in a single NetFlow cache. Network nodes 120 may enable botnet detector 110 to access one or more NetFlow caches to acquire flow data 101.

Network 130 may include a communications network, a data network, or a combination of networks that connect network elements 140. For example, network 130 may include local area networks (LANs), wireless local area networks (WLANs), VLANs, metropolitan area networks (MANs), wide area networks (WANs), VPNs, intranets (including the Intranet), or an extranet. In another example, network 130 may include a radio network capable of supporting wireless communications to/from one or more devices in environment 100, and the radio network may include, for example, a long-term evolution (LTE) network, another 3rd Generation Partnership Project (3GPP) 3G/4G network, Global System for Mobile Communications (GSM), wideband code division multiple access (WCDMA), Ultra Mobile Broadband (UMB), Universal Mobile Telecommunications System (UMTS), Code Division Multiple Access 1000 (CDMA2000), High-Speed Packet Access (HSPA), Worldwide Interoperability for Microwave Access (WiMax), enhanced high-rate packet data (eHRPD), or a network implemented in accordance with other wireless network standards.

Network elements 140 may include, for example, computers, network appliances, servers, routers, switches, gateways, bridges, load-balancers, firewalls, processors, modules, or any other suitable device, component, element, or object that handle flows via network 130. Network elements 140 may further include, for example, a computation or communication device that communicates via network 130. For example, network elements 140 may include a cellular telephone; a personal communications system (PCS) terminal (e.g., that may combine a cellular telephone with data processing and data communications capabilities); a personal digital assistant (PDA) (e.g., that can include a radiotelephone, a pager, Internet/intranet access, etc.); a smart phone; a laptop computer; a tablet computer; a camera; a personal gaming system, or another type of mobile computation and communication device.

Environment 100 may include fewer components, additional components, different components, and/or differently arranged components than those illustrated in FIG. 1A. Additionally or alternatively, one or more operations described as being performed by a particular component of environment 100 may be performed by one or more other components, in addition to or instead of the particular component of environment 100. For example, a network node 120 may function as a network element 140 such that flows originate from and/or are received by the network node 120. Thus, a network node 120 may collect flow data 101 about a flow originating from/ending at the network node 120 (or another network node 120).

Figure 1B:
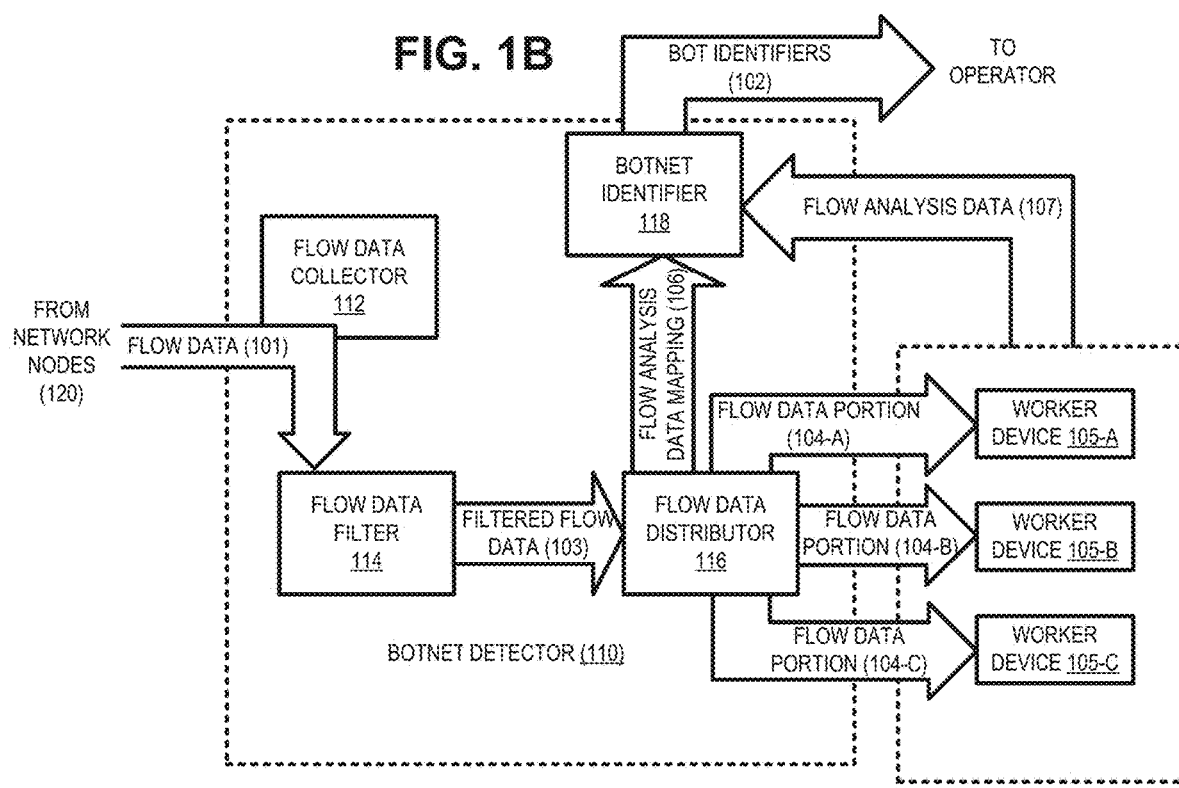
FIG. 1B shows a diagram of exemplary components that may be included in a botnet detector included in the environment shown in FIG. 1A.

FIG. 1B shows exemplary components of botnet detector 110 in one implementation. As shown in FIG. 1B, botnet detector 110 may include, for example, a flow data collector 112, a flow data filter 114, a flow data distributor 116, and a botnet identifier 118. Flow data collector 112 may obtain flow data 101 from network nodes 120. For example, flow data collector 112 may define a policy (e.g., a NetFlow policy). A policy may include information pertaining to the type of flow data 101 to be collected; the time sampling of data; filters; packet classification; export format; and other flow attributes, in flow data 101, to be reported. Network nodes 120 may collect and store (e.g., in a Netflow Cache) flow data 101 based on the policy. Flow data collector 112 may obtain flow data 101 from the NetFlow cache using a suitable protocol, such as User Datagram Protocol (UDP).

Flow data 101 collected by flow data collector 112 may be filtered by flow data filter 114. For example, flow data filter 114 may identify portions of flow data 101 associated with certain flows to form filtered flow data 103. For example, flow data filter 114 may identify and remove portions of flow data 101 associated with older flow (e.g., flows occurring during a prior time period). In another example, flow data filter 114 may identify and remove portions of flow data 101 associated with flows between one or more network elements 140 that are not of interest to botnet detector 110, such as network elements 140 associated with another service provider, network elements 140 outside a geographic region of interest, etc. In yet another example, flow data filter 114 may identify and remove flow data 101 associated with flows between one or more network elements 140 that are known to be unassociated with a botnet, such as network elements 140 associated well-known websites (e.g., the 1000 websites most commonly accessed by users in network 120).

As shown in FIG. 1B, flow data distributor 116 may receive filtered flow data 103 and may distribute portions of flow data 103 (shown in FIG. 1B as flow data portions 104-A, 104-B, and 104-C) among worker devices 105 (shown in FIG. 1B as worker devices 105-A, 105-B, and 105-C). For example, each flow data portion 104 may relate a portion of flow data 101 associated with one or more network nodes 120, one or more network elements 140, one or more paths through network 130, and/or one or more flows. Each of worker devices 105 may process a received flow data portion 104 to identify particular patterns in the flow, such as to determine whether flows are established between two network elements 140 on a periodic bases (e.g., at fairly regular intervals) or whether flows between two network elements 140 are associated with long sessions times at one or more network nodes 120 (e.g., sessions associated with botnet tunneling.

In one example, flow data distributor 116 may use a MapReduce algorithm for distributing flow data portions 104. In a MapReduce algorithm, flow data distributor 116 may use a "Map" step that causes worker device 105 to apply a "map( )" function to process flow data portions 104 and to store results of processing the flow data portions 104 to a temporary storage. Next, in a "shuffle" step, worker devices 105 redistribute data (e.g., flow data portions 104) based on the output keys (e.g., produced by the "map( )"

function), such that data belonging to one key is located on the same worker node. Next, in a "reduce" step, worker devices 105 process each group of received data based on the key.

In one implementation, flow data distributor 116 may implement a MapReduce algorithm based on Hadoop®. For example, flow data distributor 116 may implement a Hadoop distributed file system (HDFS), and worker devices 105 may combine to form a distributed, scalable, and portable file system for a Hadoop framework. For example, flow data distributor 116 and/or one of worker devices 105 may function as a dedicated name node that hosts a file system index to manage the HDFS and the other worker devices 105 may store flow data portions 104 and perform operations on the flow data portions 104.

Flow data distributor 116 may further forward a flow analysis data mapping 106 to botnet identifier 118. Flow analysis data mapping 106 enables botnet identifier 118 to receive and interpret flow analysis data 107 from worker device 105. For example, botnet identifier 118 may use flow analysis data mapping 106 to identify different network elements 140 associated with portions of flow data 101, and botnet identifier 118 may use this information to identify network elements 140 associated with portions of flow analysis data 107. Botnet identifier 118 may, for example, identify portions of flow analysis data 107 associated with suspicious behavior, and then identify (based on flow analysis data mapping 106) network elements 140 associated with the suspicious behavior. In another example, botnet identifier 118 may use flow analysis data mapping 106 to combine different portions of flow analysis data 107 and may use the combined flow analysis data 107 to identify the suspicious behavior.

Botnet identifier 118 may further output bot identifiers 102 that identify network elements 140 that are possibly associated with a botnet. For example, identifiers 102 may include IP addresses, device identifiers (e.g., device serial numbers), geographic locations, telephone numbers, media access control (MAC) addresses, etc. associated with identified network elements 140.

Botnet detector 110 may include fewer components, additional components, different components, and/or differently arranged components than those illustrated in FIG. 1B. Additionally or alternatively, one or more operations described as being performed by a particular component of botnet detector 110 may be performed by one or more other components, in addition to or instead of the particular component of botnet detector 110.

Figure 2:
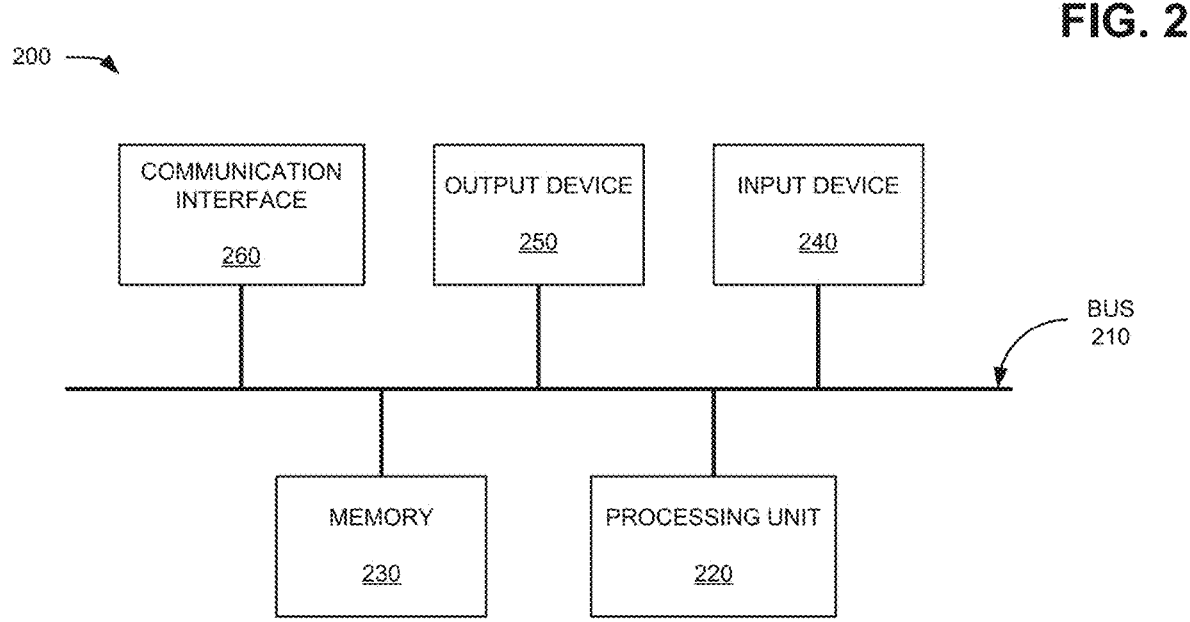
FIG. 2 shows a diagram of exemplary components that may be included in a computing device included in the environment shown in FIG. 1A.

FIG. 2 is a diagram illustrating exemplary components of a device 200. Each of botnet detector 110 (or the components of botnet detector 110 shown in FIG. 1B), network node 120, and/or network elements 140 may include one or more devices 200. As shown in FIG. 2, device 200 may include a bus 210, a processing unit 220, a memory 230, an input device 240, and output device 250, and a communication interface 260.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220. Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communication interface 260 may include any transceiver that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of RF signals. For example, Communication interface 260 may include one or more antennas to transmit and/or receive RF signals over the air. Communication interface 260 may, for example, receive RF signals and transmit them over the air. In one implementation, for example, communication interface 260 may communicate with a network and/or devices connected to a network. Alternatively or additionally, communication interface 260 may be a logical component that includes input and output ports, input and output systems, and/or other input and output components that facilitate the transmission of data to other devices.

Device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Device 200 may include fewer components, additional components, different components, and/or differently arranged components than those illustrated in FIG. 2. As an example, in some implementations, a display may not be included in device 200. In these situations, device 200 may be a "headless" device that does not include input component 240. Additionally, or alternatively, one or more operations described as being performed by a particular component of device 200 may be performed by one or more other components, in addition to or instead of the particular component of device 200.

FIG. 3 shows a flow data table 300 that includes exemplary types of information that may be included in flow data 101. For example, as shown in FIG. 3, flow data 300 may include a flow identifier column 310, a flow start time column 320, and a flow end time column 330. It should be appreciated that data in a row of flow data table 300 is associated with a same flow (e.g., Flow ID 1, Start Time 1, and End Time 1 are associated with the same flow).

A flow ID stored in flow ID column 310 may include data that may be used to uniquely identify packets included in the flow. For example, an entry in flow identifier column 310 may include data identifying a source IP address of a flow and a destination IP address of the flow. Each of the source and destination IP address may designate a network element 140. A flow ID in flow ID column 310 may further include data identifying a source port in a source network element 140 and a destination port in a destination network element 140 The flow ID in flow ID column 310 may also include a layer 4 (e.g., transport layer) protocol associated with the flow. For example, the flow ID may include data identifying a transmission control protocol (TCP) setting, a user datagram protocol (UDP) setting and/or an Internet control message protocol (ICMP) setting for the flow.

Flow start time column 320 may include an entry identifying when a first packet in a flow (e.g., a request to establish a path/session for the flow) is received and flow end time column 330 may store an entry identifying when a last packet in the flow is received. In another example, the entries in flow start time column 320 and flow end time column 330 may include data identifying a time period that the source port and destination port in flow ID column 310 are reserved (e.g., open) for the flow.

Flow data table 300 may include fewer data, additional data, different data, and/or differently arranged data than those illustrated in FIG. 3. Additionally or alternatively, information described as being stored in a portion of flow data table 300 may be stored in another portion of flow data table 300.

Figure 4:
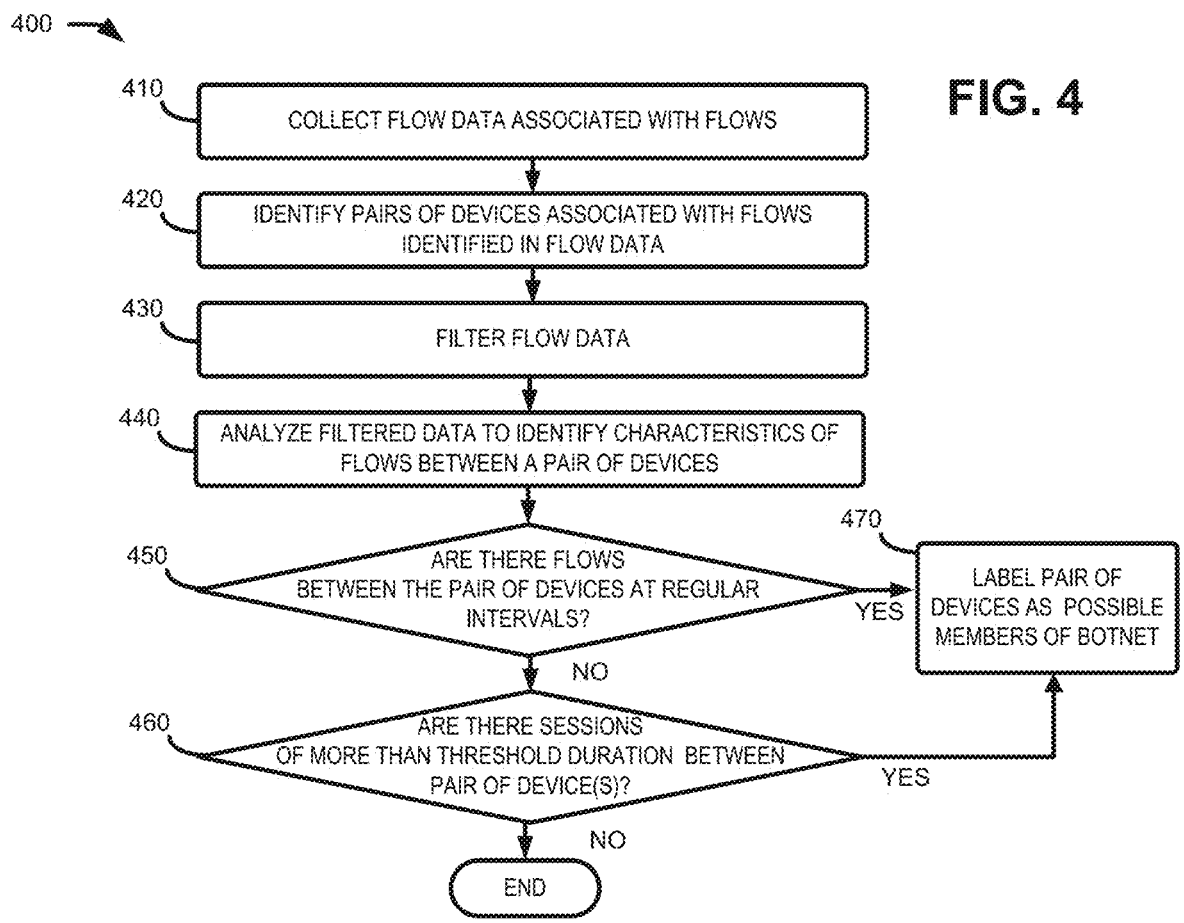
FIG. 4 shows a flow diagram illustrating an exemplary process for processing flow data to detect a botnet in the environment shown in FIG. 1A.

FIG. 4 is a flow diagram illustrating an exemplary process 400 for processing flow data 101 to identify network elements 140 included in a botnet. In one implementation, process 400 may be performed by botnet detector 110. Process 400 is described below with respect to components of botnet detector 110 depicted in FIG. 1B. In other implementations, process 400 may be performed by one or more other devices of environment 100, such as a network node 120 or a network element 140.

As shown in FIG. 4, process 400 may include collecting flow data 101 (block 410) and identifying pairs of network elements 140 associated with the flows identified in flow data (block 420). For example, flow data collector 112 may identify one or more data collection criteria and may collect, from network nodes 120, Netflow data or other flow data 101 conforming to the collection criteria. For example, flow data collector 112 may identify a time frame, geographic region, a device type, a communications type, etc. and flow data collector 112 may collect flow data 101 associated with the conforming flows. Botnet detector 110 may process a portion of flow data 101 to identify source and destination IP addresses (or other identifiers) of network elements 140 associated with the flows. For example, botnet detector 110 may parse an entry in flow ID column 310 to identify the source and destination network elements 140 for the flow.

As shown in FIG. 4, process 400 may further include filtering the flow data (block 430). For example, flow data filter 114 may remove data for flows associated with certain network elements 140. For example, flow data filter 114 may identify secure network elements 140, such as network elements 140 that were previously evaluated as secure, network elements 140 associated with popular websites, network elements 140 that are controlled by a service provider associated with botnet detector 110, network elements 140 having certain characteristics (e.g., hardware/software) that would exclude the network elements 140 from being included in a botnet, etc.

As shown in FIG. 4, process 400 may also include analyzing the filtered data to identify characteristics of flows between a pair of network elements 140 (block 440). For example, as described above with respect to FIG. 1B, worker devices 105 may receive (e.g., from flow data distributor) and analyze flow data portions 104 to identify the characteristics of flows between a pair of network elements 140. For example, worker devices 105 may determine whether there are flows at regular intervals between a pair of network elements 140 (block 450). The determination in block 450 is described in greater detail below with respect to FIGS. 5 and 6.

As shown in FIG. 4, process 400 may further include botnet detector 110 determining whether there are sessions of more than a threshold duration between the pair of devices (block 460). For example, botnet detector 110 may collect a portion of flow data 101 that includes a source IP address, a destination IP address, source port, and a destination port (extracted from an associated entry in flow ID column 310), a start time (extracted from an entry in flow start time column 320), and an end time (extracted from an entry in flow end time column 330). Botnet detector 110 may evaluate the portion of flow data 101 to determine whether a source port and a destination port associated with a flow and reserved for a session that lasts more than a threshold duration (e.g., may be associated with botnet tunneling). The threshold duration may depend on the network elements 140 associated with the input and output ports (e.g., source and destination network elements 140). For example, each network element 140 may have a programmed maximum session length, and botnet detector 110 may determine whether a flow session has a duration (e.g., time between the start time and end time) that corresponds to and/or exceeds the programmed maximum session length. In another example, botnet detector 110 may determine whether a flow had a duration that included multiple sessions (e.g., the flow session timed out on a network element 140, so the network node established one or more additional sessions for the same flow).

If botnet detector 110 determines that there are periodically occurring flows between a pair of network elements 140 at regular intervals (block 450—Yes) and/or that there are sessions of more than a threshold duration between the pair of network elements 140 (block 460—Yes), then botnet detector 110 may label the pair of network elements 140 as possible members of a botnet (block 470). For example, botnet identifier 118 may forward bot identifiers 102 that include data (e.g., an IP address, MAC address, associated ports, locations, etc.) associated with the pair of network elements 140. Otherwise, if botnet detector 110 determines that there are no flows at regular intervals between a pair of network elements 140 (block 450—No) or if botnet detector 110 determines that there are not at least a threshold quantity of sessions of more than a threshold duration between the pair of network elements 140 (block 460—No), process 400 may end without labeling the pair of network elements 140 as possible members of a botnet.

In another implementation, botnet detector 110 may score a network element 140 based on attributes of flows to/from that network element 140. For example, botnet detector 110 may score a network element 140 based on the number of periodically occurring flows to/from that network element 140 and/or a number of extended sessions (e.g., sessions that exceed a threshold duration) associated with flows to/from the network element 140. Botnet detector 110 may then label the network element 140 as a possible member of a botnet in block 470 if the score for that network element 140 exceeds a threshold number.

Scoring a network element 140 may include, for example, assigning a small score/number to the network element 140 if that network element 140 is associated with flows having a slightly periodic behavior (e.g., the network element infrequently 140 sends/receives flows at regular intervals), and a relatively higher score/number if network element 140 is associated with flows having a strong periodic behavior (e.g., many of the flows sent/received by the network element 140 occur at regular intervals). In another example, a small score may be assigned to a network element 140 that sends periodically occurring flows to a relatively small number of other network elements 140 (e.g., less than 3) and a larger score may be assigned to another network element 140 that sends periodically occurring flows to a relatively larger number of other network elements 140 (e.g., more than 3). In yet another example, a small score may be assigned to a network element 140 if that network element 140 is associated with a small number of sessions that exceed a threshold duration, and a relatively higher score may be assigned to the network element 140 if many/most of the flow sessions associated with the network element 140 exceed the threshold duration.

Although botnet detector 110 has been described is looking for periodicity and/or session duration associated with flows, it should be appreciated that botnet detector 110 may also evaluate whether a network element 140 is included in a botnet based on different and/or additional factors. For example, botnet detector 110 may further score a network element 140 based on a transmission control protocol for an associated flow, an amount of data (e.g., number of packets) carried in the flow, a format of the packets in the flow, contents of the packets, etc. For example, a score may be assigned to a network element 140 if flows are periodically sent from and/or received by the network element, but a relatively higher score may be assigned to the network element 140 if the periodically occurring flows carry data in a format that is frequently used by in botnet beacons. In another example, a score may be assigned to a network element 140 if it is associated with long sessions (e.g., sessions lasting more than a threshold duration), but a second, relatively higher score may be assigned to the network element 140 if less than a threshold amount of data is transmitted to/from the network element 140 during the long sessions.

Botnet detector 110, in process 400, may use information identifying network elements 140 as being included in a botnet to identify other network elements 140 that may be included in the botnet. For example, botnet detector 110 may evaluate other network elements 140 associated with flows with the identified network elements 140 and/or are associated with similar periodic flow transmissions patterns. In another example, botnet detector 110 may use a botnet beaconing interval identified in a pair of network elements 140 to determine whether another pair of network elements 140 is included in the same botnet (e.g., using a similar botnet beaconing interval).

Figure 5:
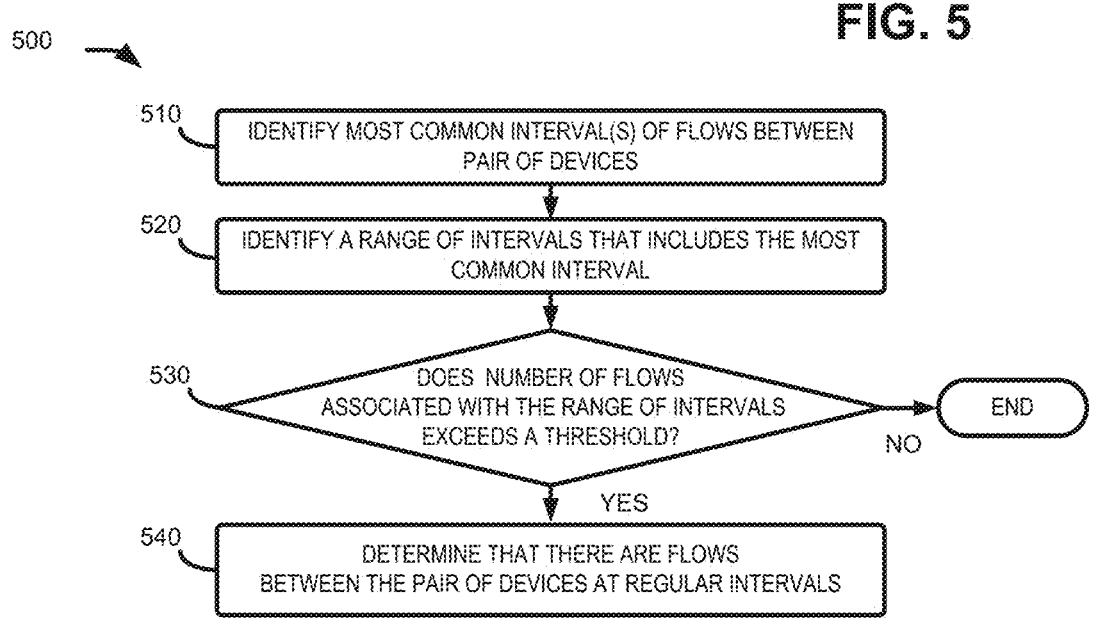
FIG. 5 shows a flow diagram illustrating an exemplary process for determining whether there are flows at regular intervals between a pair of network elements in the environment shown in FIG. 1A based on identifying common intervals in the flows.

FIG. 5 shows an exemplary process 500 for determining whether there are flows at regular intervals between a pair of network elements 140 based on identifying common intervals in the flows. In one implementation, process 500 may be performed by botnet detector 110. In other implementations, process 500 may be performed by one or more other devices of environment 100, such as a network node 120 or a network element 140.

As shown in FIG. 5, process 500 may include identifying a most common interval of flows between a pair of network elements 140 (block 510). For example, botnet detector 110 may identify start times associated with flows between two network elements 140 and may determine the intervals between the start times. A start time for a flow may be identified, for example, based on corresponding data included in a flow identifier (e.g., included in an entry in flow ID column 310). Botnet detector 110 may identify the intervals for flows between the pair of network elements 140 and may identify a most common interval. When evaluating intervals, botnet detector 110 may identify and ignore flows associated with intervals below a threshold value, such as flows occurring during a same time period (e.g., during the same minute). In another example, botnet detector 110 may ignore flows of certain attributes, such as flows carrying certain types of data, flows of certain duration, flows carrying certain quantities of data, etc.

A range of intervals that includes the most common interval may be identified (block 520). For example, botnet detector 110 may determine a desired deviation from the most common interval identified in block 510, and botnet detector 110 may determine a range of intervals based on the desired deviation. For example, botnet detector 110 may determine the desired deviation based on a percentage of the most common interval (e.g., 10% of the most common interval) and the range of intervals may correspond to the most common interval plus/minus the desired deviation. Botnet detector 110 may also determine the range based on other flows between the pair of network elements 140. For example, botnet detector 110 may identify a number of flows (e.g., 10 flows) that are similar to the most common interval, and may determine a range of intervals that includes the identified flows. Additionally or alternatively, botnet detector 110 may identify the intervals based on a standard deviation, variance, or other statistical measure associated with flow intervals. If multiple common intervals are identified in block 510, botnet detector 110 may identify multiple ranges of intervals in block 520.

Botnet detector 110 may determine whether the number of flows associated with the range of intervals exceeds a threshold (block 530). For example, botnet detector 110 may determine whether more than a particular quantity of flows (e.g., more than 5 flows) and/or more that a particular portion (e.g., more that 10%) of the flows between two network elements 140 are included in the range of intervals. If the number of flows associated with the range of intervals exceeds a threshold (block 530—Yes), botnet detector 110 may provide an indication (e.g., in bot identifiers 102) that the pair of network elements 140 may be associated with a botnet (block 540). Otherwise, if the number of flows associated with the range of intervals does not exceed the threshold (block 530—Not), botnet detector 110 may omit data regarding the pair from network elements 140 in bot identifiers 102, and process 500 may end.

Figure 6:
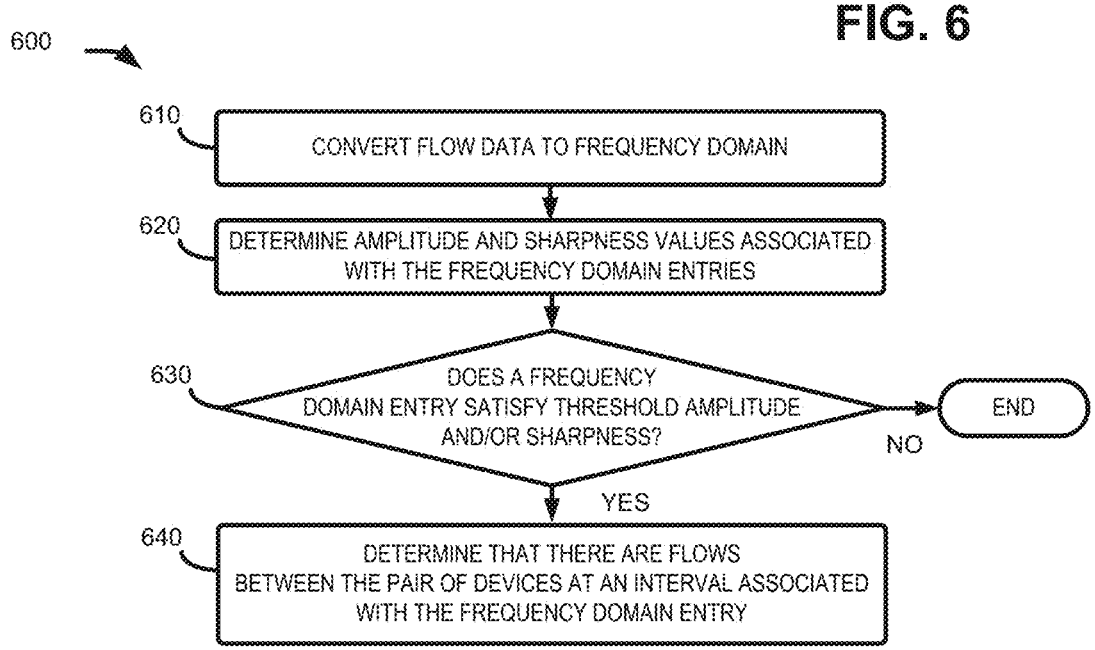
FIG. 6 shows a flow diagram illustrating an exemplary process for determining whether there are flows at regular intervals between a pair of network elements in the environment shown in FIG. 1A using a time-to-frequency transformation such as a fast Fourier transform (FFT)

FIG. 6 shows an exemplary process 600 for determining whether there are flows at regular intervals between a pair of network elements 140 using a time-to-frequency transformation such as a fast Fourier transform (FFT), a wavelet transform, a Laplace transform, a Z-transform, or another transform. In one implementation, process 600 may be performed by botnet detector 110. In other implementations, process 600 may be performed by one or more other devices of environment 100, such as a network node 120 or a network element 140.

As shown in FIG. 6, process 600 may include converting flow data 101 to the frequency domain data (block 610). For example, botnet detector 110 may identify a number of packets between two network elements 140 as a function of time, and botnet detector 110 may convert the data to the frequency domain data. As used herein, the frequency domain refers to domains (of mathematical functions) that span frequency, rather than that the ones that span time.

In one implementation, botnet detector 110 may use a FFT to convert flow data 101 to the frequency domain data. An FFT converts time-varying waveforms, such as the amounts of data between two network elements 140 at different times in a given interval, into the frequency domain waveforms, to decompose the events into their spectral components. In complex notation, the time and frequency domains, a set of data includes N complex points. Each of these complex points may be composed of a real part and an imaginary part. The FFT operates by decomposing an N point time domain signal into N time domain signals composed of a single point and then calculating the N frequency spectra corresponding to these N time domain signals to synthesize the N spectra into a single frequency spectrum.

Flow data 101 may correspond to values in an array A. For example, if flow data 101 corresponds to a number of packets sent each minute for a day, array A may have a length of 60*24, or 1440 entries. Then, botnet detector 110 may take the FFT of array A to produce a frequency transformed array B, which has half the length of array A (e.g., 1440/2 or 720 entries in the above example). Array B contains frequency-space values, and these values are complex (i.e., each value has a real part and an imaginary part). When botnet detector 110 applies the FFT to convert the contents of array A into array B, array B may describe how much of flow data 101 can be explained by a single cycle, a second element in array B may describe how much of flow data 101 may be explained by two cycles, etc.

As shown in FIG. 6, process 600 may include botnet detector 110 determining amplitude and sharpness measures associated with the frequency domain values (block 620). For example, botnet detector 110 may compute amplitudes for the entries in array B. To compute the amplitude, botnet detector 110 may compute a vector magnitude of each of the complex values in array B. For example, the vector magnitude of an entry may correspond to a square root of a sum of a square of the real portion of the entry and a square of the imaginary portion of the entry. Botnet detector 110 may find the largest of the vector magnitudes for the entries in array B, and this largest (e.g., maximum) vector magnitude may correspond to an "amplitude" for array B, and a beaconing frequency (e.g., interval) may correspond to the one or more entries associated with the amplitude.

Botnet detector 110 may further determine a "sharpness" value associated with entries in array B. For example, the sharpness for a particular entry in array B may correspond to an amplitude for the particular entry (e.g., the square root of the sum of the squares of the real and imaginary portions of the entry) divided by an average amplitude of a range of entries in array B. The range of entries in array B used to determine the sharpness value may correspond to other adjacent entries that have amplitude values that exceed a threshold value. For example, the threshold value may be half the peak amplitude values associated with the particular entry. In other examples, the number of adjacent entries used to determine the sharpness value may be selected as a percentage of the size of array B, or just a hard number (e.g., +/−3 entries to either side of the entry associated with peak amplitude measure), or some other statistical measure.

In one implementation, botnet detector 110 may ignore some of the entries in array B that correspond to noise and that may obscure the desired signal. In some situations, entries in array B associated with lowest or largest magnitudes may correspond to noise. For example, botnet detector 110 may identify and explicitly ignore a number of highest-magnitude values and then pick a largest remaining magnitude value from array B. For example, if flow data 101 is associated with periodic anomalous data spikes (e.g., a 30-minutes beaconing cycle), the magnitude for an associated entry in array B may be drowned out by other entries in array B. For example, if the first and few elements of array B have large magnitudes due to normal cycles, and the last few elements of array B have large magnitudes due to meaningless noise, then botnet detector 110 may ignore both of those types of entries. For example, if botnet detector 110 is looking for beaconing entries in the range of 1 day, botnet detector 110 may ignore entries in array B corresponding to relatively small cycles times (e.g., less than 10 minutes) and may ignore entries in array B corresponding to relatively larger cycle times (e.g., more than 3 days).

As shown in FIG. 6, process 600 may further include botnet detector 110 determining whether a frequency domain entry (e.g., an entry in array B) satisfies a threshold amplitude value and/or a threshold sharpness value (block 630). If an entry in array B satisfies the threshold amplitude value and/or the threshold sharpness value (block 630—Yes), botnet detector 110 may determine that there are flows between the pair of network elements 140 at an interval associated with the entry in array B (block 640). If none of the entries in array B satisfy the threshold amplitude value and/or the threshold sharpness value (block 630—No), botnet detector 110 may determine that the pair of network elements 140 are not exchanging beaconing signals, and process 600 may end.

Figure 7C:
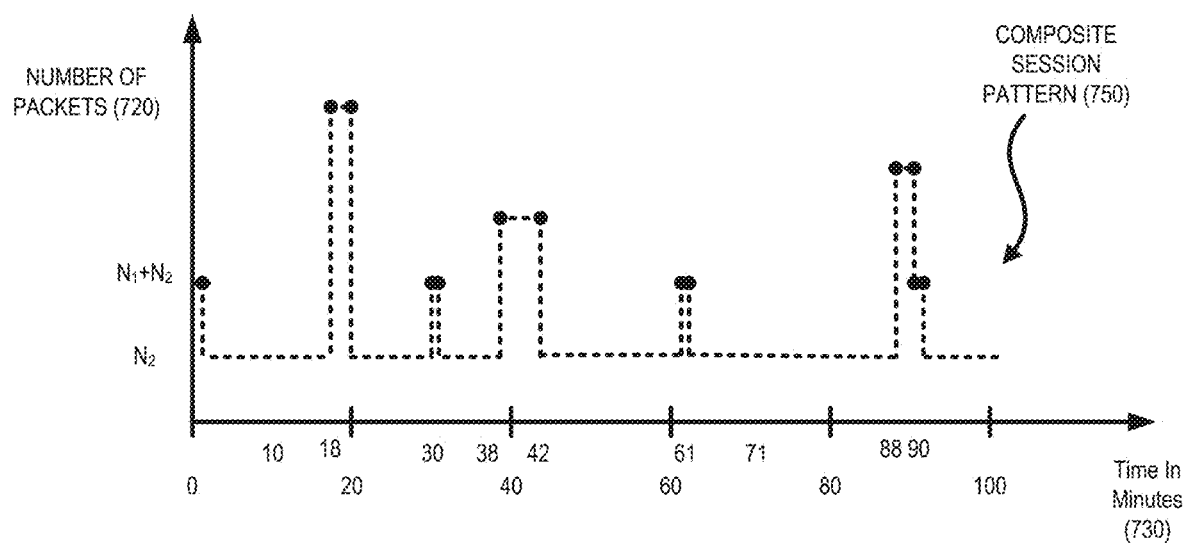

Examples of the operation of botnet detector 110 are now described with respect to FIGS. 7A-7C, 8, and 9. FIG. 7A shows an exemplary periodic beaconing pattern 710 in which number of packets 720 are transmitted periodically at times 730 (e.g., approximately every 30 minutes) in sessions that typically last less than a minute. More specifically, periodic beaconing pattern 710 shows that an $N_1$ amount of data is transmitted in flows beginning approximately every 30 minutes (e.g., at times 0, 30, 61, and 90). The time intervals between the peaks in the beaconing pattern 710 (e.g., 30 minutes in FIG. 7A) may not be uniform since network conditions and other factors may delay/accelerate the initiations of the beaconing flows. For example, periodic beaconing pattern 710 may include beaconing flows that start after an interval that is longer than the cycle period of 30 minutes (e.g., the flow starting at the time of 61 minutes starts 31 minutes after the initiation of the prior beaconing flow). Furthermore, periodic beaconing pattern 710 may also include beaconing flows that start at after an interval that is less than the cycle period of 30 minutes (e.g., the flow starting at the time of 90 minutes starts 29 minutes after the initiation of the prior beaconing flow). Furthermore, it should be appreciated that different amounts of data of data may be transmitted during in each beaconing session (e.g., not all beaconing signals transmit $N_1$ amount of data).

FIG. 7B shows an exemplary non-beaconing transmissions pattern in which numbers of packets 720 are transmitted at different times 730 between two network elements 140. For example, flows of data may be exchanged between the pair of network elements 140 based on user inputs, to execute applications, to communicate between the network elements 140, etc. In FIG. 7B, non-beaconing transmissions pattern 740 includes a base number of packets ($N_2$) is transmitted between two network elements, and that additional data is transmitted in flows between minutes 18 and 20, between minutes 38 and 42, and between 88 and 90.

FIG. 7C shows an exemplary composite session pattern 750 that represents a total number of packets 720 transmitted in flows between the two network elements 140 at different times 730. Composite session pattern 750 may represent a sum of periodic beaconing pattern 710 and non-beaconing transmissions 740. As can be seen in composite session pattern 750, the periodic beaconing pattern 710 may be obscured by non-beaconing transmissions pattern 740. Flow data 101 may correspond, for example, to numbers of packets 720 at each of the units of time 730 (e.g., minutes).

Figure 8:
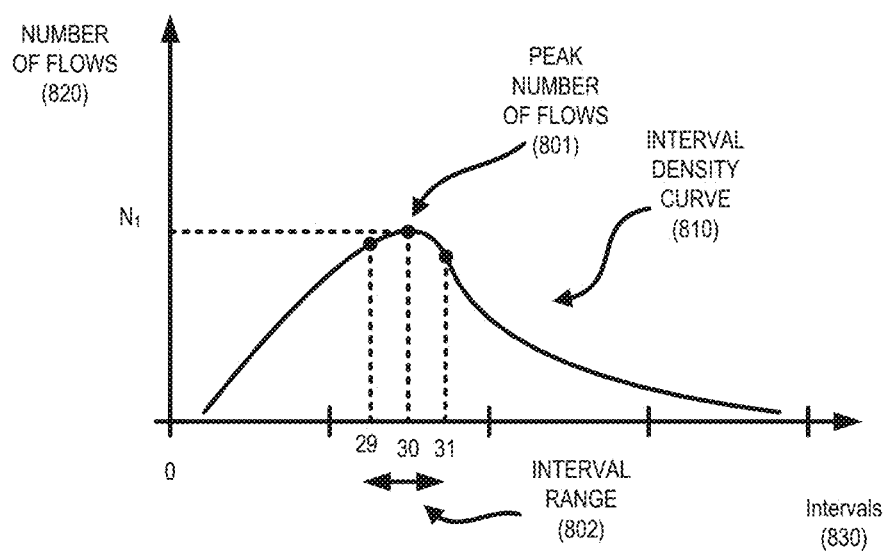

FIG. 8 shows an exemplary interval density curve 810 that may be used by botnet detector 110 to identify periodic beaconing pattern 710. Interval density curve 810 may identify a number of flows 820 between two network elements at different intervals 830. Botnet detector 110 may identify a peak number of flows 801 occurring at one of the intervals 830. In this example, peak number of flows 801 corresponds to an interval of 30 minutes. Botnet detector 110 may further identify an interval range 802 that represents, for example, intervals 830 that are "close" to peak number of flows 801. In the example shown in FIG. 8, interval range 802 includes intervals 830 between 29 and 31 minutes. Interval range 802 may be determined, for example, based as a percentage of an interval 830 associated with the peak number of flows 801 (e.g., the peak interval 810±the percentage). In another example, interval range 802 may be selected to include a number of flows (e.g., 10 flows) having intervals above and below the interval 830 associated with the peak number of flows 801.

Figure 9:
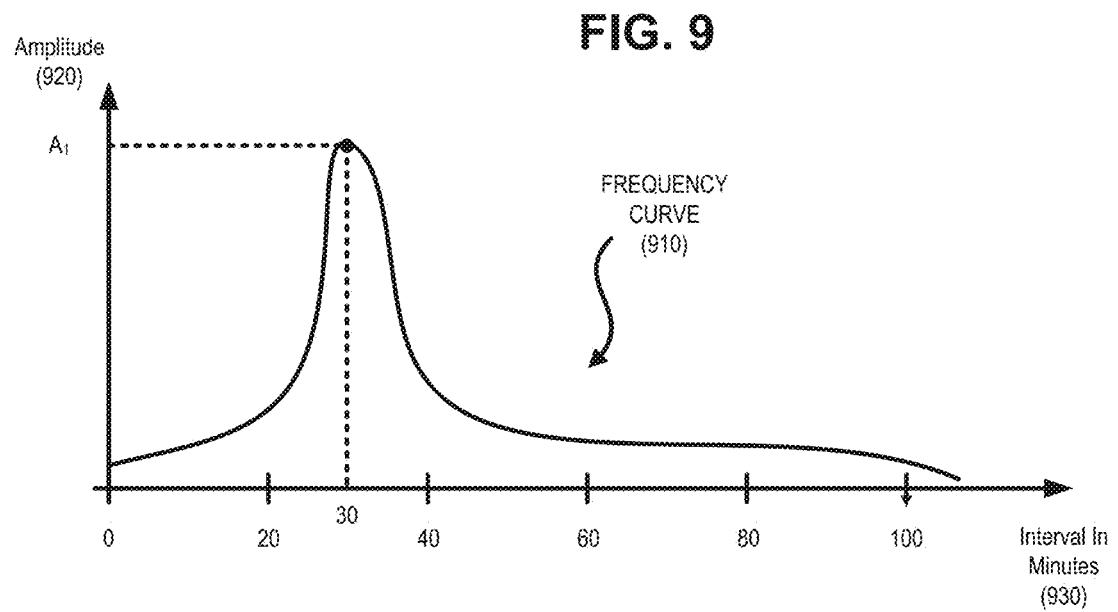

FIG. 9 shows an exemplary frequency curve 910 that may be used by botnet detector 110 to identify periodic beaconing pattern 710 using a time-to-frequency transformation, such as an FFT. Frequency curve 910 may identify an amplitude 920 associated with different intervals 930. Botnet detector 110 may identify, as a potential beaconing frequency, one of the intervals 930 associated with a highest amplitude 920 (e.g., the interval 30 minutes associated with amplitude $A_1$ in FIG. 9). As further described above with respect to process 600, botnet detector 110 may further identify one of the intervals 930 based on a sharpness value that compares the amplitude of the interval to the average amplitudes of nearby intervals. Botnet detector 110 may further identify an interval range that represents, for example, intervals 930 that are close to the identified interval. For example, botnet detector 110 may include in the range of intervals, other intervals having similar amplitude values (e.g., associated with amplitude values 930 that are within a certain percentage or quantity from $A_1$). In other examples, the number of adjacent entries used to determine the sharpness value may be selected as a percentage of the size of array B (e.g., 3% of the total entries) or based on a hard number (e.g., +/−3 entries to either side of the entry associated with peak amplitude measure), or some other statistical measure.

In one implementation, a composite frequency curve 910 may be generated based on multiple individual frequency curves 910 generated from portions of flow data 110. For example, botnet detector 110 may generate a different frequency curves 910 for flow data associated with different time periods, and botnet detector 110 may sum the frequency curves 910 to produce a composite frequency curve 910 that may describe frequency behaviors over a longer, total time period. For example, if each of the individual frequency curves 910 relate to communications during an hour, a composite frequency curve 910 may identify a longed peak interval (e.g., several hours or a day) that may not be observable on the individual frequency curves 910.

Various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

For example, while a series of blocks has been described with respect to FIGS. 4-6, the order of the blocks in processes 400, 500, and 600 may be modified in other implementations. Furthermore, non-dependent blocks may be performed in parallel. Furthermore, processes 400, 500, and 600 may include additional and/or fewer blocks than those shown in FIGS. 4-6. For example, process 400, 500, and 600 may include taking action to address network elements 140 associated with a botnet. For example, network nodes 120 may use bot identifiers 102 to block flows associated with the network elements 140 included in the botnet.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   collecting, by a processor, flow data associated with flows between a plurality of network elements;
   processing, by the processor, the flow data to identify that a subset of the flows, between a first network element and a second network element of the plurality of network elements, occur at a regular interval;
   determining, by the processor, sessions of packet transmission associated with each flow of the subset of flows;
   identifying, by the processor, one or more of the sessions that exceed a threshold amount of time;
   identifying, by the processor, at least one of the one or more sessions in which the packet transmission is below a threshold number of packets;
   determining, by the processor, that the at least one of the one or more sessions is associated with a botnet beacon and the regular interval corresponds to a botnet beaconing interval;
   using, by the processor, the botnet beaconing interval to identify a third network element of the plurality of network elements associated with a same botnet as the first and second network elements; and
   forwarding, by the processor, a notification, wherein the notification includes information identifying the first, second, and third network elements as being associated with the same botnet.

2. The method of claim 1, wherein processing the flow data further includes:
   determining the regular interval based on an interval associated with the subset of the flows.

3. The method of claim 1, wherein processing the flow data includes:
   determining a plurality of intervals associated with the flows;

identifying a most commonly occurring one of the plurality of intervals associated with the flows between the plurality of network elements; and identifying the regular interval based on the most commonly occurring interval.

4. The method of claim 3, wherein identifying the regular interval based on the most commonly occurring interval includes:

identifying a range of intervals that includes the most commonly occurring interval;

identifying a subset of the flows associated with the range of intervals; and determining that the most commonly occurring interval corresponds to the regular interval when the subset of the flows includes at least a threshold number of flows.

5. The method of claim 1, wherein processing the flow data includes:

converting the flow data to the frequency domain data;

determining an interval associated with a highest magnitude among intervals associated with the flows between the plurality of network elements; and determining the regular interval based on the interval.

6. The method of claim 5, wherein converting the flow data to the frequency domain includes applying a fast Fourier transform to the flow data.

7. The method of claim 5, wherein processing the flow data further includes:

identifying a range of intervals that include the determined interval;

determining an average magnitude associated with the range of intervals;

calculating a sharpness value based on a comparison of the magnitude associated with the interval and average magnitude associated with the range of intervals; and determining that the interval corresponds to the regular interval when the sharpness value satisfies a threshold value.

8. A device comprising:

a communication interface;

a memory configured to store instructions; and a processor configured to execute one or more of the instructions to:

collect, via the communication interface, flow data associated with flows between a plurality of network elements;

process the flow data to identify that a subset of the flows, between a first network element and a second network element of the plurality of network elements, occur at a regular interval;

determine, based on the flow data, sessions between the first network element and the second network element, wherein the sessions relate to packet transmission of the flows;

identify one or more of the sessions that exceed a threshold amount of time;

identify at least one of the one or more sessions in which the packet transmission is below a threshold number of packets;

determine that the at least one of the one or more sessions is associated with a botnet beacon and the regular interval corresponds to a botnet beaconing interval;

use the botnet beaconing interval to identify a third network element of the plurality of network elements associated with a same botnet as the first and second network elements; and forward, via the communication interface, a notification, wherein the notification includes information identifying the first, second, and third network elements as being associated with the same botnet.

9. The device of claim 8, wherein the processor, when processing the flow data, is further configured to execute one or more of the instructions to:

determine the regular interval based on an interval associated with the subset of the flows.

10. The device of claim 8, wherein the processor, when processing the flow data, is further configured to execute one or more of the instructions to:

determine a plurality of intervals associated with the flows;

identify a most commonly occurring one of the plurality of intervals associated with the flows between the plurality of network elements; and identify the regular interval based on the most commonly occurring interval.

11. The device of claim 10, wherein the processor, when identifying the regular interval based on the most commonly occurring interval, is further configured to execute one or more of the instructions to:

identify a range of intervals that include the most commonly occurring interval;

identify a subset of the flows associated with range of intervals; and determine that most commonly occurring interval corresponds to the regular interval when the subset of the flows includes at least a threshold number of flows.

12. The device of claim 8, wherein the processor, when processing the flow data, is further configured to execute one or more of the instructions to:

convert the flow data to the frequency domain data;

determine an interval associated with a highest magnitude among intervals associated with the flows between the plurality of network elements; and determine the regular interval based on the determined interval.

13. The device of claim 12, wherein the processor, when determining the interval, is further configured to execute one or more of the instructions to:

identify first intervals included in the intervals, wherein the first intervals include a smallest interval associated with the flows between the pair of network elements;

identify second intervals included in the intervals, wherein the second intervals include a largest interval associated with the flows between the pair of network elements;

filter the intervals to form third intervals, wherein filtering the intervals includes removing the first intervals and the second intervals from the intervals; and determine the interval from the third intervals.

14. The device of claim 12, wherein the processor, when processing the data, is further configured to execute one or more of the instructions to:

identify a range of intervals that include the determined interval;

determine an average magnitude associated with the range of intervals;

calculate a sharpness value based on a comparison of the magnitude associated with the interval and average magnitude associated with the range of intervals; and determine that the interval corresponds to the regular interval when the sharpness value exceeds a threshold value.

15. A non-transitory computer-readable medium to store instructions, wherein the instructions comprise:
one or more instructions that, when executed by a processor associated with a device, cause the processor to:
collect flow data associated with flows between a plurality of network elements;
process the flow data to identify that a subset of the flows, between a first network element and a second network element of the plurality of network elements, occur at a regular interval;
determine, based on the flow data, sessions between the first network element and the second network element, wherein the sessions relate to packet transmission of the flows;
identify one or more of the sessions that exceed a threshold amount of time;
identify at least one of the one or more sessions in which the packet transmission is below a threshold number of packets;
determine that the at least one of the one or more sessions is associated with a botnet beacon and the regular interval corresponds to a botnet beaconing interval;
use the botnet beaconing interval to identify a third network element of the plurality of network elements associated with a same botnet as the first and second network elements; and
forward a notification, wherein the notification includes information identifying the first, second, and third network elements as being associated with the same botnet.

16. The non-transitory computer-readable medium of claim 15, wherein the one or more instructions further cause the processor, when processing the flow data, to:
determine the regular interval based on an interval associated with the subset of the flows.

17. The non-transitory computer-readable medium of claim 15, wherein the one or more instructions further cause the processor, when processing the flow data, to:
determine a plurality of intervals associated with the flows;
identify a most commonly occurring one of the plurality of intervals associated with the flows between the plurality of network elements; and
identify the regular interval based on the most commonly occurring interval.

18. The non-transitory computer-readable medium of claim 17, wherein the one or more instructions further cause the processor, when processing the flow data, to:
identify a range of intervals that include the most commonly occurring interval;
identify a subset of the flows associated with range of intervals; and
determine that most commonly occurring interval corresponds to the regular interval when the subset of the flows includes at least a threshold number of flows.

19. The non-transitory computer-readable medium of claim 15, wherein the one or more instructions further cause the processor, when processing the flow data, to:
convert the flow data to the frequency domain data;
determine an interval associated with a highest magnitude among intervals associated with the flows between the plurality of network elements; and
determine the regular interval based on the determined interval.

20. The non-transitory computer-readable medium of claim 19, wherein the one or more instructions further cause the processor, when processing the data, to:
identify a range of intervals that include the determined interval;
determine an average magnitude associated with the range of intervals;
calculate a sharpness value based on a comparison of the magnitude associated with the interval and average magnitude associated with the range of intervals; and
determine that the interval corresponds to the regular interval when the sharpness value satisfies a threshold value.

* * * * *